US012025951B2

(12) United States Patent
Maeda

(10) Patent No.: US 12,025,951 B2
(45) Date of Patent: Jul. 2, 2024

(54) TONER, TWO-COMPONENT DEVELOPER, AND IMAGE-FORMING APPARATUS

(71) Applicant: SHARP KABUSHIKI KAISHA, Sakai (JP)

(72) Inventor: Hiroki Maeda, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 164 days.

(21) Appl. No.: 17/405,936

(22) Filed: Aug. 18, 2021

(65) Prior Publication Data

US 2022/0066342 A1 Mar. 3, 2022

(30) Foreign Application Priority Data

Sep. 2, 2020 (JP) ................................ 2020-147591

(51) Int. Cl.

*G03G 9/097* (2006.01)
*G03G 9/08* (2006.01)
*G03G 15/00* (2006.01)

(52) U.S. Cl.

CPC ....... *G03G 9/09716* (2013.01); *G03G 9/0819* (2013.01); *G03G 9/0825* (2013.01); *G03G 9/09725* (2013.01); *G03G 15/75* (2013.01)

(58) Field of Classification Search

CPC ........... G03G 5/14726; G03G 9/08755; G03G 9/09725

See application file for complete search history.

(56) References Cited

U.S. PATENT DOCUMENTS

| | | | | |
|---|---|---|---|---|
| 6,562,529 B1 * | 5/2003 | Kojima | G03G 5/14708 | 399/346 |
| 2015/0104739 A1 | 4/2015 | Nagatomo et al. | | |
| 2016/0085165 A1 * | 3/2016 | Kamiwaki | G03G 9/0825 | 430/105 |
| 2016/0154333 A1 * | 6/2016 | Sun | G03G 9/09392 | 430/108.6 |
| 2020/0103775 A1 | 4/2020 | Kitagawa et al. | | |

FOREIGN PATENT DOCUMENTS

| | | | | |
|---|---|---|---|---|
| JP | 2002-278098 | * | 9/2002 | G03G 5/05 |
| JP | 2013-163622 | A | 8/2013 | |
| JP | 2013-190646 | A | 9/2013 | |
| JP | 5439308 | B2 | 3/2014 | |
| JP | 2014174341 | A | 9/2014 | |
| JP | 2014178528 | A | 9/2014 | |
| JP | 2015176024 | A | 10/2015 | |
| JP | 2020056981 | A | 4/2020 | |

OTHER PUBLICATIONS

Translation of JP 2002-278098.*

* cited by examiner

*Primary Examiner* — Peter L Vajda
(74) *Attorney, Agent, or Firm* — ScienBiziP, P.C.

(57) ABSTRACT

The toner has a toner matrix particle containing a crystalline polyester resin. Associated silica including two or more of primary particles is present on the surface of the toner matrix particle. The coverage with associated silica onto the toner matrix particle is 1% or more to 30% or less, and the adherence strength of associated silica to the toner matrix particle is 20% or more to 90% or less.

8 Claims, 5 Drawing Sheets

TONER, TWO-COMPONENT DEVELOPER, AND IMAGE-FORMING APPARATUS

BACKGROUND OF THE INVENTION

Field of the Invention

The present invention relates to a toner, a two-component developer, and an image-forming apparatus.

Description of the Background Art

Image-forming apparatuses employing an electrographic system, such as copying machines, multifunction machines, printers, and facsimile apparatuses collect toner remaining on a photoconductive drum (e.g., a mark 10 in FIG. 2) by a cleaning blade (e.g., a mark 61 in FIG. 2). However, sometimes a phenomenon occurs in which the toner remaining on the photoconductive drum is insufficiently collected with the cleaning blade and slips through (a slipping-through phenomenon).

Causes for occurrence of a slipping-through phenomenon include that friction among toner particles in a developer tank (e.g., a mark 42 in FIG. 2) effects rolling of spherical large particle-sized silica, which is an external additive, on the surface of a toner matrix particle (toner core) and leads to uneven distribution of the large particle-sized silica into cavities present on the surface of the toner matrix particle (see FIG. 3 and FIG. 4), thereby making the toner matrix particle surface, which has stickiness, expose to have high adhesiveness to the surface of the photoconductive drum; or that the large particle-sized silica is spherical and thus makes toner fail to catch on the cleaning blade and less likely to be scraped off.

In recent years, amid a demand for energy saving, a method has been established that realizes low-temperature fixation by blending a crystalline polyester resin in a toner matrix particle. However, blending of a crystalline polyester resin leads to closer SP values of toner and a photoconductive drum surface, thus enhancing adhesiveness of the toner to the photoconductive drum. Moreover, under a low-humidity environment, a crystalline polyester-containing toner has a higher charge, thus further enhancing adhesiveness to a photoconductive drum. Therefore, a crystalline polyester resin-containing toner has a problem in incapability to sufficiently prevent occurrence of a slipping-through phenomenon, whereas a crystalline polyester resin-free toner has been capable of preventing occurrence of a slipping-through phenomenon even in a toner employing spherical large particle-sized silica.

Japanese Patent Application Laid-Open Publication No. 2013-163622, Japanese Patent Application Laid-Open Publication No. 2013-190646, and Japanese Patent No. 5439308 discloses use of associated silica rather than spherical large particle-sized silica, as an external additive for a toner. However, these have not disclosed any toner that can solve the problem described above in a crystalline polyester resin-containing toner.

The present invention was made on the basis of the circumstances described above, and an object thereof is to provide a toner capable of suppressing occurrence of a slipping-through phenomenon in a toner having a toner matrix particle (toner core) containing a crystalline polyester resin, and a two-component developer and an image-forming apparatus that employ the toner.

SUMMARY OF THE INVENTION

To solve the problem described above, the present invention provides a toner, a two-component developer, and an image-forming apparatus as below.

(1) Toner

A toner according to an embodiment of the present invention is a toner having a toner matrix particle containing a crystalline polyester resin, wherein associated silica having two or more primary particles associating is present on the surface of the toner matrix particle, wherein the coverage with the associated silica to the toner matrix particle is 1% or more to 30% or less, and wherein the adherence strength of the associated silica to the toner matrix particle is 20% or more to 90% or less.

According to an embodiment of the invention described above, external addition (adhesion) of associated silica to a toner matrix particle causes a contact point and a contact area between a silica particle and a toner matrix particle surface to be larger than that in spherical silica, thus making silica particles less unevenly distributed into cavities on the toner matrix particle. This consequently allows suppressing exposure of the toner matrix particle surface. Furthermore, a contact area between a cleaning blade and a silica particle also increases, thus facilitating catching on the cleaning blade and allowing toner remaining on a photoconductive drum to be successfully scraped off. Accordingly, it is possible to suppress occurrence of a slipping-through phenomenon.

In the toner described above, the associated silica is further preferably hydrophobized with hexamethyldisilazane.

In such case, adhesiveness to a photoconductive drum can be suppressed, because it is considered that hydrophobization of associated silica with hexamethyldisilazane can release inner moisture of silica to the surface to electrically provide a leakage effect under a low-humidity environment, as well as maintain a charge under a high-humidity environment. Accordingly, it is possible to further suppress occurrence of a slipping-through phenomenon.

Additionally, in the toner described above, the mean primary particle diameter of the associated silica is also preferably 10 nm or more to 200 nm or less.

Having a mean primary particle diameter of the associated silica in the range of 10 nm or more to 200 nm or less allows prevention of aggregation among toner particles and improvement in transfer property of a toner, which are functions required for an external additive.

(2) Two-Component Developer

A two-component developer according to an embodiment of the present invention is a two-component developer containing the toner described above and a carrier. Inclusion of the toner in the two-component developer allows realizing a two-component developer with suppressed occurrence of a slipping-through phenomenon.

(3) Image-Forming Apparatus

An image-forming apparatus according to an embodiment of the present invention is an image-forming apparatus employing the two-component developer described above. Use of the two-component developer by the image-forming apparatus allows realizing an image-forming apparatus with suppressed occurrence of a slipping-through phenomenon.

In the image-forming apparatus described above, it is preferable that the image-forming apparatus include a photoconductive drum, and that difference between the SP value of the surface of the photoconductive drum and the SP value of the crystalline polyester resin be 1.5 or more.

Setting difference between the SP value of the photoconductive drum surface and the SP value of a crystalline polyester resin contained in the toner to 1.5 or more allows reducing adhesiveness of the photoconductive drum to the toner, and suppressing occurrence of a slipping-through phenomenon.

A resin forming the surface of the photoconductive drum described above is preferably polytetrafluoroethylene.

The surface (a charge transfer layer, which is the most external layer) of a photoconductive drum included in the image-forming apparatus commonly employs a polycarbonate resin. Nevertheless, use of polytetrafluoroethylene separates the SP value of the photoconductive drum surface from the SP value of the crystalline polyester resin and allows difference of the SP values to be 1.5 or more, thus enabling suppression of adhesion of the toner to the photoconductive drum surface.

According to an embodiment of the present invention, it is possible to suppress occurrence of a slipping-through phenomenon in a toner having toner matrix particles containing a crystalline polyester resin.

DESCRIPTION OF THE PREFERRED EMBODIMENTS

Figure 1:
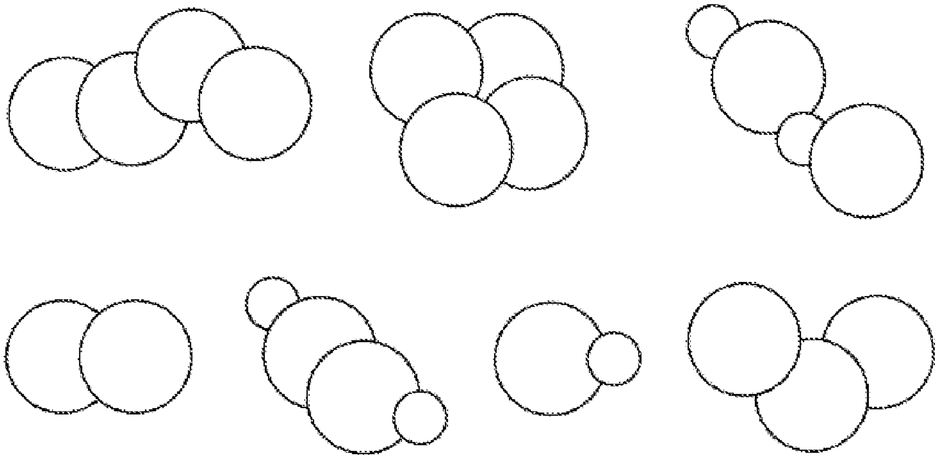
FIG. 1 is an illustration schematically showing associated silica in which two or more of primary particles of silica associate.

The present invention includes a toner, a two-component developer, and an image-forming apparatus. These will now be described in detail below.

Toner and Toner Matrix Particles

A toner according to an embodiment of the present invention has a toner matrix particle containing a binding resin, and an external additive adhering to the surface of the toner matrix particle. In addition, the binding resin of the toner according to an embodiment of the present invention contains a non-crystalline polyester resin and a crystalline polyester resin. Moreover, in the toner according to an embodiment of the present invention, the crystalline polyester resin is dispersed in the non-crystalline polyester resin. Incidentally, a toner having a toner particle that includes the external additive adhering to the surface of a toner matrix particle is referred to as an external additive toner, as appropriate hereinafter.

The volume mean particle diameter of a primary particle of the toner matrix particle is not particularly limited, but a toner matrix particle having e.g., a volume mean particle diameter of 4 μm or more to 8 μm or less can be exemplified. The non-crystalline polyester resin and the crystalline polyester resin are thermoplastic resins. The crystalline polyester resin forms into a particle shape, and is dispersed and present in a matrix phase formed of the non-crystalline polyester resin.

Additionally, the toner matrix particle may contain a colorant, a charge control agent (CCA), a mold lubricant, and the like. Constituents other than an external additive are also collectively referred to as an internal additive. As the colorant, an organic dye, an organic pigment, an inorganic dye, an inorganic pigment, or the like used in the field of electrophotography can be employed. As the charge control agent, charge control agents for positive charge control and negative charge control used in the field of electrophotography can be employed. As the mold lubricant, wax used in the field of electrophotography can be employed.

Binding Resin

The toner matrix particle according to an embodiment of the present invention contains a crystalline polyester resin and a non-crystalline polyester resin as the binding resin. The crystalline polyester resin is dispersed in the non-crystalline polyester resin.

In the present invention, the crystalline resin and the non-crystalline resin are distinguished by crystallinity indices; a resin having a crystallinity index in the range of 0.6 or more to 1.5 or less is defined as the crystalline resin, and a resin having a crystallinity index in the range of less than 0.6 or more than 1.5 is defined as the non-crystalline resin. A resin having a crystallinity index of more than 1.5 is non-crystalline, and meanwhile, a resin having a crystallinity index of less than 0.6 has low crystallinity and a large amount of non-crystalline parts.

Incidentally, crystallinity index is a physical property to be an index of degree of crystallization of a resin, and is defined by a ratio of softening temperature to endothermic maximum peak temperature (softening temperature/endothermic maximum peak temperature). Here, endothermic maximum peak temperature designates a temperature of a peak located closest to the highest temperature among endothermic peaks observed. The crystalline polyester resin is set to have a maximum peak temperature defined as a melting point, and the non-crystalline polyester resin is set to have a peak closest to the highest temperature defined as a glass-transition point.

The degree of crystallization can be controlled by adjusting a type and ratio of a raw material monomer, and a manufacturing condition (e.g., reaction temperature, reaction time, cooling rate), and the like.

Crystalline Polyester Resin

The crystalline polyester resin is a polyester resin having a crystallinity index of 0.6-1.5, but is preferably a polyester resin having a crystallinity index of 0.8-1.2. In addition, the crystalline polyester resin can be obtained by, e.g., polycondensation of polybasic acid and polyhydric alcohol. Manufacturing can be made by a known method described in, e.g., Japanese Patent Application Laid-Open Publication No. 2006-113473.

Examples of polyhydric alcohols include ethylene glycol, 1,2-propylene glycol, 1,3-propylene glycol, 1,4-butanediol, 1,5-pentanediol, 1,6-hexanediol, 1,7-heptanediol, 1,8-octanediol, neopentyl glycol, and 1,4-butenediol, but it is preferable to use a polyhydric alcohol that promotes crystallinity of a resin, such as an aliphatic diol with a carbon number of 2-8. Here, such polyhydric alcohols may be used alone or in combination of two or more types.

In view of improving crystallinity of a resin, the content of aliphatic diol having a carbon number of 2-8 in polyhydric alcohol is preferably 80 mol % or more; furthermore, in use of two types of aliphatic diols having a carbon number of 2-8, the content of one aliphatic diol having a carbon number of 2-8 is preferably 70 mol % or more in polyhydric alcohol.

Examples of polybasic acids include aliphatic dicarboxylic acids having a carbon number of 2-30, preferably 2-8, such as fumaric acid, adipic acid, oxalic acid, malonic acid, maleic acid, fumaric acid, citraconic acid, itaconic acid, glutaconic acid, succinic acid, sebacic acid, azelaic acid, n-dodecylsuccinic acid, and n-dodecenylsuccinic acid; aromatic dicarboxylic acids such as phthalic acid, isophthalic acid, and terephthalic acid; alicyclic dicarboxylic acids such as cyclohexanedicarboxylic acid; and polycarboxylic acids having three or more valencies such as trimellitic acid and pyromellitic acid. For the purpose of obtaining high degree of crystallinity (crystallinity index), aliphatic dicarboxylic acid is preferable, and aliphatic dicarboxylic acid having a carbon number of 2-8 is more preferable. Here, such polybasic acids may be used alone or in combination of two or more types.

The acid value of the crystalline polyester resin is preferably 5 mg KOH/g or more to 20 mg KOH/g or less. Meanwhile, the hydroxyl value of the crystalline polyester resin is preferably 5 mg KOH/g or more to 20 mg KOH/g or less.

The molecular weight of the crystalline polyester resin is preferably 5000 or more to 100000 or less by weight-average molecular weight (Mw), and preferably 3000 or more to 20000 or less by number-average molecular weight (Mn). In the present invention, weight-average molecular weight and number-average molecular weight are values measured by gel permeation chromatography (GPC), which employs chloroform as a mobile phase and employs polystyrene as a reference substance.

The softening temperature of the crystalline polyester resin is preferably such that the crystalline polyester resin is to have a temperature of 60° C. or more to 105° C. or less.

In the toner according to an embodiment of the present invention, the content of the crystalline polyester resin is not particularly limited, but is preferably 5-20% by mass, and more preferably 7-15% by mass in the toner matrix particles. The content of the crystalline polyester resin at the above-described lower limit or more can facilitate improvement of low-temperature fixability. The content of the crystalline polyester resin at the above-described upper limit or less can facilitate improvement of heat-resistant preservability of the toner.

Non-Crystalline Polyester Resin

The non-crystalline polyester resin is a polyester resin having a crystallinity index of less than 0.6 or more than 1.5, but is preferably a polyester resin having a crystallinity index of more than 1.5. In addition, the non-crystalline polyester resin can be obtained by, e.g., polycondensation of polybasic acid and polyhydric alcohol.

As polybasic acid, known monomers for polyester synthesis can be used, and examples include aromatic carboxylic acids such as terephthalic acid, isophthalic acid, phthalic anhydride, trimellitic acid, trimellitic anhydride, pyromellitic acid, and naphthalenedicarboxylic acid; aliphatic carboxylic acids such as maleic anhydride, fumaric acid, succinic acid, alkenyl succinic anhydride, and adipic acid; and methyl esterified compounds of such polybasic acids. Such polybasic acids may be used alone or in combination of two or more types.

Also as polyhydric alcohol, known monomers for polyester synthesis can be used, and examples include aliphatic polyhydric alcohols such as ethylene glycol, propylene glycol, butanediol, hexanediol, neopentyl glycol, and glycerin; alicyclic polyhydric alcohols such as cyclohexanediol, cyclohexanedimethanol, and hydrogenated bisphenol A; and aromatic diols such as an ethylene oxide adduct of bisphenol A and a propylene oxide adduct of bisphenol A. Such polyhydric alcohols may be used alone or in combination of two or more types.

A polycondensation reaction of polybasic acid and polyhydric alcohol can be performed in accordance with a common method, e.g., is carried out by contacting polybasic acid with polyhydric alcohol in the presence or absence of an organic solvent and in the presence of polycondensation catalyst (such as tin octanoate); and then the reaction is terminated once the acid value, softening temperature, and the like of the polyester thus generated reach desired values. This provides the non-crystalline polyester resin. Use of a methyl esterified compound of polybasic acid as a part of polybasic acid provides methanol-eliminating polycondensation reaction. In this polycondensation reaction, appropriate change of the compounding ratio of polybasic acid to polyhydric alcohol, the reaction rate, or the like allows, e.g., adjusting the content of carboxyl groups on the end terminal of polyester, and in turn modifying a characteristic of the non-crystalline polyester resin thus obtained. In addition, use of trimellitic anhydride as polybasic acid allows easy introduction of a carboxyl group into the main chain of polyester.

Additionally, polycondensation reaction of polybasic acid and polyhydric alcohol is performed under a temperature condition of commonly about 150° C.-300° C., and preferably about 170° C.-280° C. Furthermore, the polycondensation reaction described above can be performed under normal pressure, reduced pressure, or applied pressure, but it is preferable to appropriately adjust pressure inside a system along with tracing progress of the polycondensation reaction by physical property values (e.g., acid value, melting point) or a stirring torque or power value of a reactor.

The acid value of the non-crystalline polyester resin is preferably 10 KOH mg/g or more to 30 KOH mg/g or less, and more preferably 15 KOH mg/g or more to 25 KOH mg/g or less.

The non-crystalline polyester resin has preferably a weight-average molecular weight (Mw) of 5000 or more to 50000 or less, and preferably a number-average molecular weight (Mn) of 1000 or more to 10000 or less. In the present invention, weight-average molecular weight and number-average molecular weight are values measured by gel permeation chromatography (GPC), which employs tetrahydrofuran (THF) as a mobile phase and employs polystyrene as a reference substance.

The glass-transition temperature (Tg) of the non-crystalline polyester resin is preferably 55° C. or more to 70° C. or less.

In the toner according to an embodiment of the present invention, the content of the non-crystalline polyester resin is not particularly limited, but is preferably 75-90% by mass in the toner matrix particles.

Associated Silica and Other External Additives

In the present invention, associated silica refers to what includes two or more primary particles of silica associating. The associated silica can be manufactured, e.g., by sol-gel method.

The number of the primary particles composing the associated silica is preferably 2 or more to 20 or less. When the number of the primary particles composing the associated silica is above 20, the associated silica is likely to come off from a toner surface, potentially causing contamination within a machine, increase in the amount of adherence to a photoconductive drum, and the like.

In the toner according to an embodiment of the present invention, the associated silica is present on the surface of the toner matrix particle, wherein the coverage with the associated silica to the toner matrix particle is 1% or more to 30% or less. The coverage is more preferably 2.5% or more to 20% or less, and even more preferably 2.5% or more to 15% or less. With the coverage with the associated silica at less than the lower limit described above, the associated silica may not exhibit a function as an external additive. Meanwhile, with more than the upper limit described above, the associated silica potentially come off within a developer tank, causing the associated silica to contaminate a carrier, the inside of a machine, and the like.

Additionally, in the toner according to an embodiment of the present invention, the adherence strength of the associated silica to the toner matrix particle is 20% or more to 90% or less. The adherence strength is more preferably 45% or more to 75% or less. With the adherence strength of the associated silica at less than the lower limit described above, the associated silica may not exhibit a function as an external additive, and furthermore, the associated silica potentially come off within a developer tank, causing the associated silica to contaminate a carrier, the inside of a machine, and the like.

The associated silica in an embodiment of the present invention is preferably hydrophobized with hexamethyldisilazane. Adhesiveness to a photoconductive drum can be suppressed, because it is considered that hydrophobization of the associated silica with hexamethyldisilazane can release inner moisture of silica to the surface to electrically provide a leakage effect under a low-humidity environment, as well as maintain a charge under a high-humidity environment. Accordingly, it is possible to further suppress occurrence of a slipping-through phenomenon.

Here, likewise in use of a hydrophobizer other than hexamethyldisilazane, a charge under a low-humidity environment can be lowered by adjusting a developer, reducing an additive amount (lowering the coverage), or the like, but in such way, a charge under a high-humidity environment is also lowered.

The mean primary particle diameter of the associated silica in an embodiment of the present invention is preferably 10 nm or more to 200 nm or less. Having a mean primary particle diameter of the associated silica in the range of 10 nm or more to 200 nm or less allows prevention of aggregation among toner particles and improvement in transfer property of a toner, which are functions required for an external additive.

The toner according to an embodiment of the present invention may contain an external additive other than the associated silica within the scope not lacking an effect of an embodiment of the present invention. Examples of such external additives include a microparticle having a mean particle diameter of 7 nm-200 nm that is an inorganic microparticle of silica, titanium oxide, alumina, or the like, or a material derived by surface treatment (hydrophobization) of the inorganic microparticle with a silane coupling agent, a titanium coupling agent, or silicone oil. The additive amount of the external additive is not particularly limited, but is preferably 0.2-3 mass parts relative to 100 mass parts of the toner matrix particles. Less than 0.2 mass parts of the additive amount of the external additive makes it difficult to provide an effect for improving fluidity, and meanwhile, more than 3 mass parts may lead to reduced fixability. In addition, a common method for adding an external additive is commonly a method of mixing toner matrix particles and an external additive in an air blending machine such as a Henschel mixer.

Manufacturing Method of Toner

Next, a method of manufacturing the toner according to an embodiment of the present invention will be described. The toner according to an embodiment of the present invention can be manufactured by a known method such as a kneading grinding method or an aggregation method. For example, in manufacturing the toner according to an embodiment of the present invention by a kneading milling method, the binding resin, which contains the non-crystalline polyester resin and the crystalline polyester resin, is first mixed with the internal additive such as a mold lubricant, a colorant, or an electrical resistance control agent, which is appropriately selected as required, by an air blending machine such as a Henschel mixer, and the raw material mixture thus obtained is kneaded at about 100° C.-180° C. with a melt kneader such as a biaxial kneader or an open-roll kneader. Then, the melt-kneaded material thus obtained is cooled and solidified, and the solidified material is milled with an air mill such as a jet mil and subjected to adjustment of particle size such as classification if required, thereby enabling manufacture of the toner matrix particles.

Two-Component Developer

A two-component developer according to an embodiment of the present invention contains the toner according to an embodiment of the present invention and a carrier. The two-component developer can be manufactured by mixing the toner and the carrier using a known mixer. The weight ratio of the toner to the carrier is not particularly limited, but can exemplified with 3:97-12:88.

Image-Forming Apparatus

Figure 2:
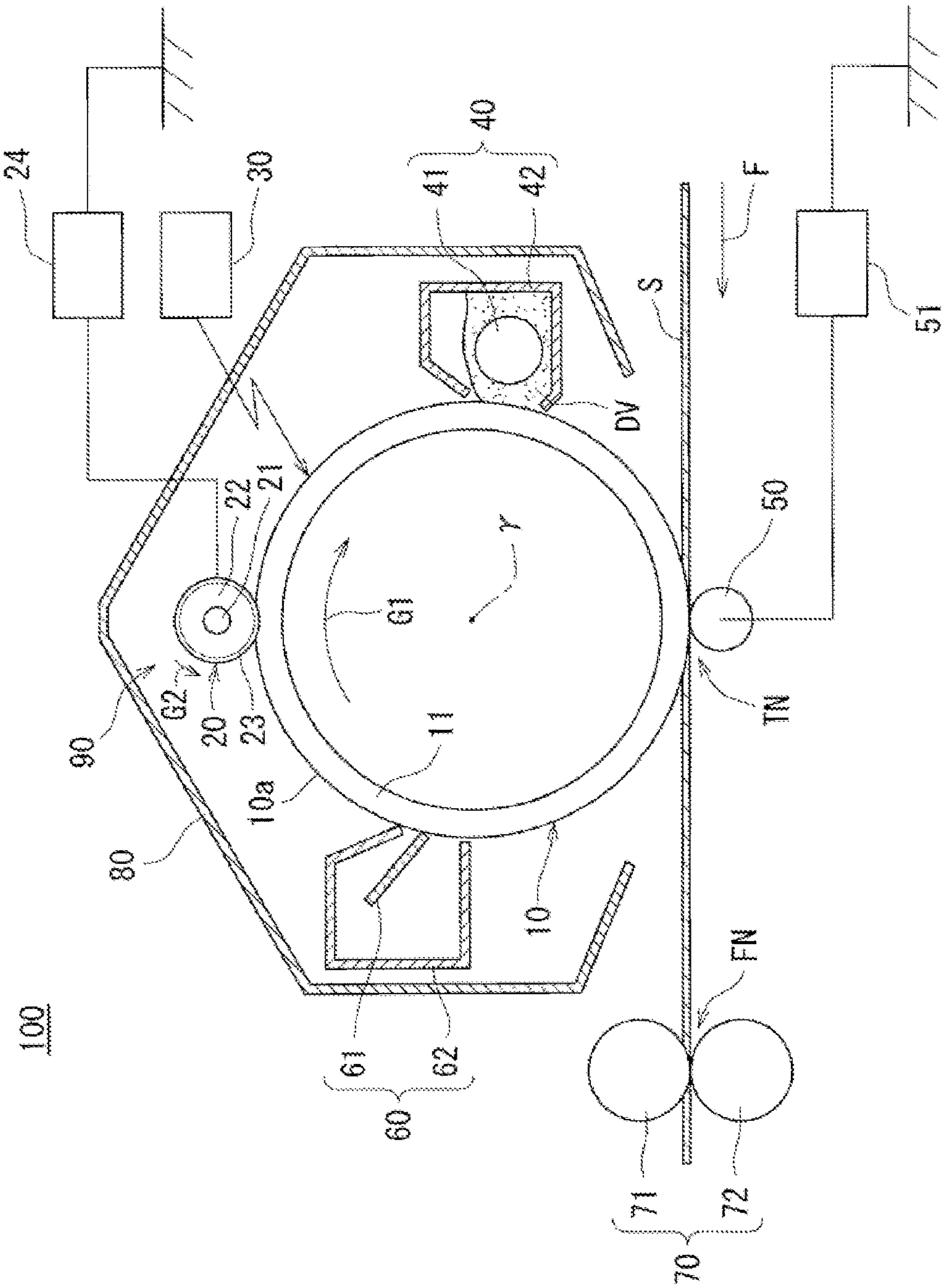
FIG. 2 is a cross-sectional view schematically showing a general configuration of an image-forming apparatus including a developing apparatus that performs developing with a two-component developer according to the embodiment.
Figure 3:
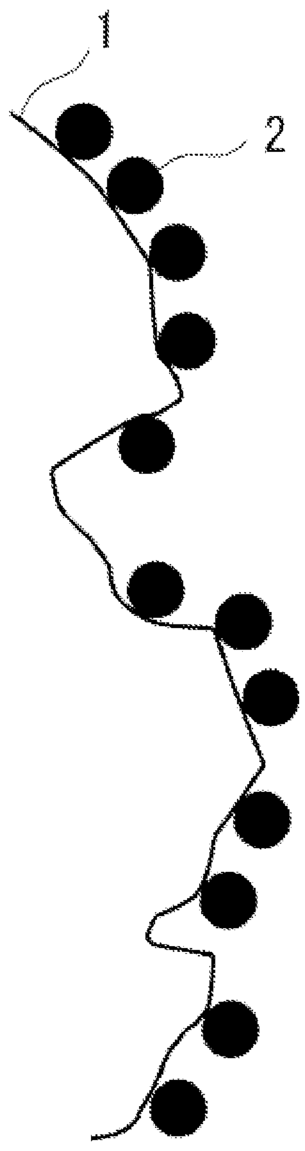
FIG. 3 is an illustration showing a situation before uneven distribution, among illustrations schematically showing an appearance where large particle-sized silica rolls on a toner surface and are unevenly distributed into cavities on the toner surface, in a toner employing spherical large particle-sized silica as an external additive.
Figure 4:
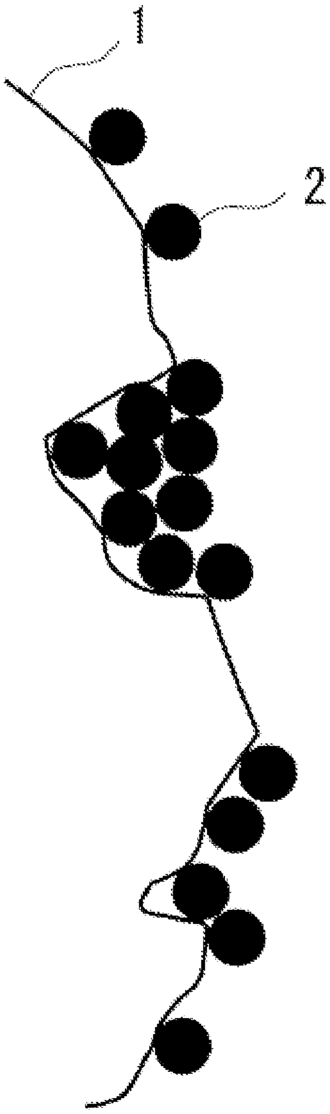
FIG. 4 is an illustration showing a situation after uneven distribution, among illustrations schematically showing an appearance where large particle-sized silica rolls on a toner surface and are unevenly distributed into cavities on the toner surface, in a toner employing spherical large particle-sized silica as an external additive.

FIG. 2 is a cross-sectional view schematically showing a general configuration of an image-forming apparatus 100 including a developing apparatus 40 that performs developing with a two-component developer DV according to the embodiment.

As shown in FIG. 2, the image-forming apparatus 100 includes a photoconductive drum 10, which functions as an image carrier, a charging apparatus 90, an exposing apparatus 30, a developing apparatus 40, a transferring charging apparatus 50, a cleaning apparatus 60, and a fixing apparatus 70. The charging apparatus 90 charges a surface 10*a* of the photoconductive drum 10. The exposing apparatus 30 exposes the photoconductive drum 10 charged by the charging apparatus 90 and forms an electrostatic latent image. The developing apparatus 40 develops the electrostatic latent image formed by the exposing apparatus 30 and forms a toner image. The transferring charging apparatus 50 transfers the toner image formed by the developing apparatus 40, on a recording medium S such as a recording paper. The cleaning apparatus 60 removes and collects a toner remaining on the photoconductive drum 10. The fixing apparatus 70 fixes on the recording medium S the toner image transferred by the transferring charging apparatus 50 and forms an image. In this case, the image-forming apparatus 100 is represented by a monochrome printer (particularly a laser printer). Here, the image-forming apparatus 100 may be, for example, an intermediate-transfer color image-forming apparatus that can form a color image. Additionally, despite being represented by a printer in this case, the image-forming apparatus 100 may be, e.g., a copying machine, a multifunction machine, or a facsimile apparatus.

The photoconductive drum 10 has a base body 11 rotatably supported to a body frame of the image-forming apparatus 100 (not shown), and is rotationally driven about a rotation axis line y and in a predetermined rotation direction G1 (clockwise in the figure) by a driver, depiction of which is omitted.

The charging apparatus 90 includes a charging roller 20, which functions as a charging member. The charging roller 20 contacts with the surface 10*a* of the photoconductive drum 10. The charging apparatus 90 uniformly charges the surface 10*a* of the photoconductive drum 10 to a predetermined electric potential with a high-voltage applying apparatus 24. The charging roller 20 dependently rotates along with rotation of the photoconductive drum 10 in a direction G2 opposite to the rotation direction G1. The charging roller 20 includes a rotation axis 21, a cylindrical elastic member 22, which is formed on the rotation axis 21, and a resistance layer 23, which is formed on the elastic member 22. The outer diameter of the charging roller 20 can be exemplified with, but not limited to, about 8 mm-14 mm. The rotation axis 21 can employ e.g., a metallic material. The elastic member 22 has appropriate electric conductivity for ensuring electric supply for the photoconductive drum 10. The resistance layer 23 can adjust electric resistance of the whole of the charging roller 20.

The exposing apparatus 30 repeatedly runs light modulated on the basis of image information, on the surface 10*a* of the photoconductive drum 10 rotationally driven and in the direction of the rotation axis line y of the photoconductive drum 10, which is a main running direction. The developing apparatus 40 includes a developing roller 41 and a developer tank 42. The developing roller 41 supplies a two-component developer DV to the surface 10*a* of the photoconductive drum 10. The developer tank 42 contains the two-component developer DV. The transferring charging apparatus 50 applies a predetermined high voltage with a high-voltage applying apparatus 51 to a transfer nip part TN formed between the photoconductive drum 10 and the transferring charging apparatus 50. The cleaning apparatus 60 include a cleaning blade 61 and a collecting casing 62. The cleaning blade 61 removes a toner remaining on the surface 10*a* of the photoconductive drum 10. The collecting casing 62 accommodates the toner removed by the cleaning blade 61. The fixing apparatus 70 includes a heating roller 71 and a pressure applying roller 72. The pressure applying roller 72 is pressed by the heating roller 71 and forms a fixing nip part FN. Moreover, the image-forming apparatus 100 further include a housing 80, which contains each component composing the image-forming apparatus 100. Here, in FIG. 2, a mark F indicates a conveying direction of the recording medium S.

In the image-forming apparatus 100, difference between the SP value of the surface 10*a* of the photoconductive drum (the SP value of a charge transfer layer, which is the most external layer of the photoconductive drum) and the SP value of the crystalline polyester resin contained in the toner matrix particle is preferably 1.5 or more, more preferably 2.0 or more, and particularly preferably 3.0 or more. Setting difference of the SP values to the above-described lower limit or more allows reducing adhesiveness of the photoconductive drum to the toner, and suppressing occurrence of a slipping-through phenomenon.

The resin forming the surface 10*a* of the photoconductive drum (a charge transfer layer, which is the most external layer of the photoconductive drum) is preferably polytetrafluoroethylene. The surface (charge transfer layer) of the photoconductive drum included in the image-forming apparatus commonly employs a polycarbonate resin. Nevertheless, use of polytetrafluoroethylene separates the SP value of the photoconductive drum surface from the SP value of the crystalline polyester resin and allows difference of the SP values to be 1.5 or more, thus enabling suppression of adhesion of the toner to the photoconductive drum surface.

Here, it is also assumed that the SP value of the crystalline polyester resin is changed to have a difference of the SP value from the surface of the photoconductive drum of 1.5 or more, but this potentially leads to compatibilization with a primary resin, thus deteriorating heat-resistant preservability.

Carrier

The carrier is stirred and mixed with the toner within the developer tank 42 to provide the toner with a desired charge. The carrier also functions as an electrode between the developing apparatus 40 and the photoconductive drum 10 shown in FIG. 2, and serves to carry the charged toner to an electrostatic latent image on the photoconductive drum 10 and to form a toner image. The carrier is held on the developing roller 41 of the developing apparatus 40 by magnetic force, affects developing, then returns to the developer tank 42 again, and is stirred and mixed with a new toner again to be repeatedly used until its life-span expired.

The carrier has a carrier core material, and a resin layer coated on the carrier core material. The carrier core material is not particularly limited as long as it is used in the field of electrophotography. Particular examples of the carrier core materials can include magnetic metals such as iron, copper, nickel, and cobalt, and magnetic metal oxides such as ferrite and magnetite. The volume mean particle diameter of the carrier core material is not particularly limited, but can be exemplified with, e.g., 30 μm-100 μm. The resin layer preferably contains a silicone resin. The silicone resin can suppress consumption of the toner T. The resin layer contains a fluororesin. Specific examples of the fluororesins can include polytetrafluoroethylene (PTFE), perfluoroalkoxy resin (PFA), and ethylene tetrafluoroethylene copolymer (ETFE).

EXAMPLES

The present invention will now be described on the basis of the examples and comparative examples, but the present invention is not limited by such examples. First, measurements in the examples and the like will be described. Here, associated silica or large particle-sized globular silica in the examples and comparative examples is referred to as a large silica particle, as appropriate hereinafter.

Calculation Method for SP Values

Measurement was performed as follows, in accordance with SUH and CLARKE method (Suh and Clarke (K. W. Suh, D. H. Clarke), "Cohesive Energy Densities of Polymers from Turbidimetric Titrations", Journal of Polymer Science, A-1, vol. 5, 1967, p. 1671-1681) as a measurement method for SP values.

A resin to be measured was weighed to 0.5 g in a 100 mL beaker, added with 10 mL of good solvent (a mixture solution of dioxane and acetone) with a whole pipette, and stirred and solved with a magnetic stirrer. To this solution, hydrophobic solvent (a mixture solution of n-hexane and ion-exchanged water) was dropped with a 50 mL burette, and a point of generation of turbidity at a measurement temperature of 20° C. was defined as a dropping amount.

SP value δ of the resin was derived from this measurement value in accordance with the following formula:

$$\delta=(V1/2\delta l+Vh/2\delta h)/(V1/2+Vh/2)$$

In the formula, V1 is a molecular volume of a solvent (mL/mol) in a low-SP solvent (hydrophobic solvent) mixture system, Vh is a molecular volume of a solvent (mL/mol) in a high-SP solvent (good solvent) mixture system, δ1 is a SP value of a solvent in a low-SP solvent (hydrophobic solvent) mixture system, δh is a SP value of a solvent in a high-SP solvent (good solvent) mixture system.

Measurement Method for Mean Primary Particle Diameter of Large Silica Particles

The mean primary particle diameter of large silica particles was derived in accordance with the following method.

First, for a toner, particles were photographed using a scanning electron microscope (SEM) (manufactured by Hitachi High-Tech Corporation, model: S-4800), and the particle diameters (longitudinal diameter) of 100 large silica particles on the toner surface were arbitrarily measured from the image thus obtained. Then, the mean value of the 100 particle diameters was calculated and defined as a mean primary particle diameter.

Calculation Method for Coverage with Large Silica Particles

Model calculation in a projected area was performed using the mean particle diameter and specific gravity of toner matrix particles and the mean particle diameter and specific gravity of each external additive, to derive the coverage ratio of each of the external additives.

Then, an external toner was photographed with a scanning electron microscope (SEM) (manufactured by Hitachi High-Tech Corporation, model: S-4800) to confirm the coverage.

Measurement Method for Charge Amount of Toner Under a Low-Humidity Environment

A developer on a mag roller of a developer tank was sampled to 0.2 g, and a charge amount was derived under an environment at a temperature of 25° C. and a relative humidity of 5%, using a small-sized suction charge amount measurement apparatus, model 210HS-2A manufactured by Trek, Inc.

The evaluation criteria of the charge amount is as follows:

low: having a charge amount of less than 18 μC/g;

medium: having a charge amount of 18 μC/g or more to 35 μC/g or less; and high: having a charge amount of more than 35 μC/g.

Measurement Method for Adherence Strength of Large Silica Particles

Adherence strength of large silica particles in each toner was measured in accordance with the following procedure:

(1) weigh 2.0 g of a toner into a 100 mL beaker, add 40 mL of Triton aqueous solution with a concentration of 0.2% by mass, and then stir for a minute with a stirrer;

(2) irradiate the aqueous solution described above with ultrasonic waves under conditions at an output of 40 μA for 4 minutes using a ultrasonic homogenizer (manufactured by Nihonseiki Kaisya Ltd., model: US-300T), to release an external additive;

(3) leave the aqueous solution after ultrasonic wave irradiation standing for 3 hours to separate the toner from the external additive;

(4) after removal of a supernatant, add 50 mL of pure water to the precipitation and stir for 5 minutes with a stirrer;

(5) perform suction filtration using a membrane filter with a pore size of 1 μm (manufactured by Advantech Co., Ltd.);

(6) dry in vacuo the toner remaining on the filter for 24 hours in a desiccator containing silica gel; and (7) analyze strength of element Si in 1 g of the toner before and after a series of the treatments (1)-(6) described above using a fluorescent X-ray analyzer (manufactured by Rigaku Corporation, model: ZSX Primus II), and calculate adherence strength of silica in accordance with the following formula.

Adherence strength of silica (%)=[(Si strength after treatment)/(Si strength before treatment)]×100

Evaluation Method for a Contamination Level within a Machine

The evaluation criteria of a contamination level within a machine is as follows:

+: adhesion of white powder of silica is not observed around a developer tank; and −: white powder of silica is clearly adhered around a developer tank.

Evaluation Method for a Slipping-Through Level Under a Low-humidity Environment

The two-component developer and the toner thus made were filled in a developing apparatus and a toner cartridge, respectively, of a color multifunction machine (manufactured by Sharp Corporation, product name: MX-4151), a continuous printing test of 50,000 sheets was performed under an environment at 25° C. and 5% humidity in such manner that 10 elongated rectangular solid images with a width of 1 mm and a long side of 25 cm (ID=1.45-1.50) would be formed in an interval of 1 cm in a rotation direction of a photoconductive drum.

The evaluation criteria of a slipping-through level is as follows:

+++: excellent; no slipping-through of toner is observed on a photoconductive drum surface, and no slipping-through of toner is also observed on a cleaning blade;

++: good; no slipping-through of toner is observed on a photoconductive drum surface, but slipping-through of toner is observed on a cleaning blade;

+: passed slight slipping-through of toner is observed on a photoconductive drum surface, and slipping-through of toner is observed on a cleaning blade; and −: failedslipping-through of toner is clearly observed on a photoconductive drum surface, and slipping-through of toner is observed on a cleaning blade.

Figure 5:
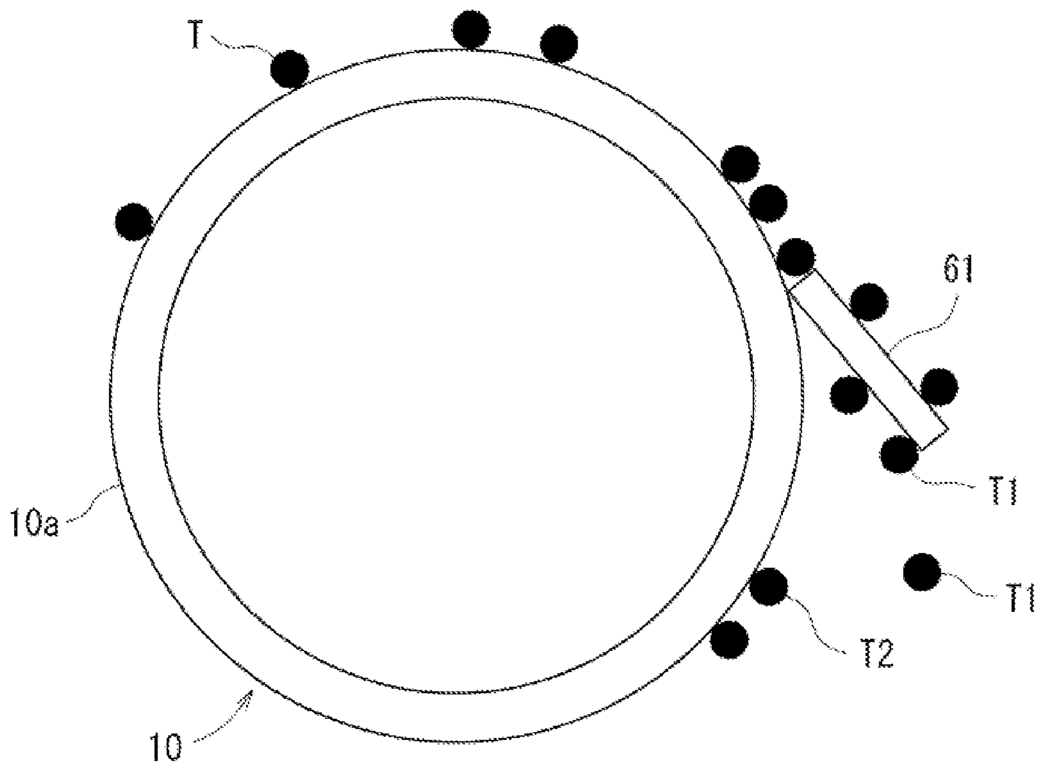
FIG. 5 is an illustration schematically showing a mechanism of a slipping-through phenomenon.

Incidentally, in a slipping-through phenomenon, no toner particle slipping through onto the photoconductive drum is observed at the beginning, but toner particles on the cleaning blade gradually slip through and begin to adhere on the lower part of the cleaning blade or to drop into a process unit, as indicated as toner particles T1 in FIG. 5. Then, when slipping-through increases, slipping-through toner particles come to mount on the photoconductive drum, as indicated as toner particles T2 in FIG. 5.

General Evaluation Method for Toners, Two-Component Developers, and Image-forming Apparatuses General evaluation was performed on the basis of the evaluation results of the evaluation items (slipping-through levels and contamination levels within a machine under a low-humidity environment) described above, in accordance with the following criteria:

+++: excellent; a slipping-through level is +++, and a contamination level within a machine is ++; available;

++: good; a slipping-through level is ++, and a contamination level within a machine is ++; available;

+: passed; a slipping-through level is +, and a contamination level within a machine is ++; available; and −: failed; at least one of the evaluation items has −; unavailable.

Preparation of Large Silica Particles (S1) A silica sol obtained in a wet process by sol-gel method was subjected to hydrophobization (HMDS (hexamethylene silazane) treatment) as well as addition of an association-promoting additive (tetraalkyl ammonium hydroxide compound), to provide hydrophobic associated silica. The mean primary particle diameter was 125 nm.

Preparation of Large Silica Particles (S2) A silica sol obtained in a wet process by sol-gel method was subjected to hydrophobization (PDMS (polydimethyl siloxane) treatment) as well as addition of an association-promoting additive (tetraalkyl ammonium hydroxide compound), to provide hydrophobic associated silica. The mean primary particle diameter was 125 nm.

Preparation of Large Silica Particles (S3) A silica sol obtained in a wet process by sol-gel method was subjected to hydrophobization (HMDS treatment), to provide hydrophobic globular silica. The mean primary particle diameter was 125 nm.

Preparation of Large Silica Particles (S4) A silica sol obtained in a wet process by sol-gel method was subjected to hydrophobization (PDMS treatment), to provide hydrophobic globular silica. The mean primary particle diameter was 125 nm.

Example 1 To 100 mass parts of toner matrix particles (with a mean particle diameter of 7.0 μm), 1.0 mass parts of silica with a volume mean particle diameter of 20 nm (manufactured by Nippon Aerosil Co., Ltd.), 0.6 mass parts of titanium oxide with a volume mean particle diameter of 20 nm (manufactured by Teika Pharmaceutical Co., Ltd.), and 1.9 mass parts of large silica particles (S1) were added, mixed by a Henschel mixer (manufactured by Nippon Coke and Engineering Co., Ltd., model: FM20C), passed through a 500-mesh aperture sieve, to provide an external toner.

Further, the external toner thus obtained and ferrite core carrier with a volume mean particle diameter of 40 μm were adjusted and mixed so as to have a concentration of the external toner of 7% by mass to the total volume of the two-component developer, to provide a two-component developer with a toner concentration of 7% by mass.

Examples 2-11 and Comparative Examples 1-9 The following Table 1 shows types, mean primary particle diameters, and additive amounts of large silica particles used in examples and comparative examples, and coverage with the large silica particles. External toners and two-component developers were obtained in the same manner as Example 1, except for changing the large silica particles in Example 1 (S1) for each of the types and additive amounts of the large silica particles shown in Table 1.

TABLE 1

| | Type of large silica | Primary particle size of large silica (μm) | Additive amount of large silica (mass parts) | Coverage (%) |
|---|---|---|---|---|
| Example 1 | S1 | 125 | 1.9 | 13 |
| Example 2 | S1 | 125 | 0.25 | 1.6 |
| Example 3 | S2 | 125 | 1.9 | 13 |
| Example 4 | S2 | 125 | 1.9 | 13 |
| Example 5 | S1 | 125 | 1.9 | 13 |
| Example 8 | S2 | 125 | 0.35 | 2.5 |
| Example 7 | S2 | 125 | 0.9 | 6.5 |
| Example 8 | S1 | 125 | 0.25 | 16 |
| Example 9 | S1 | 125 | 1.9 | 13 |
| Example 10 | S1 | 125 | 1.9 | 13 |
| Example 11 | S1 | 125 | 1.9 | 13 |
| Comparative Example 1 | S1 | 125 | 4.9 | 34 |
| Comparative Example 2 | S3 | 125 | 2.4 | 17 |
| Comparative Example 3 | S1 | 125 | 0.1 | 0.7 |
| Comparative Example 4 | S1 | 125 | 3.3 | 23 |
| Comparative Example 5 | S1 | 125 | 3.3 | 23 |
| Comparative Example 6 | S4 | 125 | 4.9 | 34 |
| Comparative Example 7 | S3 | 125 | 0.1 | 0.7 |
| Comparative Example 8 | S4 | 125 | 3.3 | 23 |
| Comparative Example 9 | S2 | 125 | 3.3 | 23 |

The following Table 2 shows types of large silica particles, types of resins of the most external layer of a photoconductive drum used in measurement, measurement results of charge amount of a toner under a low-humidity environment, calculation results of difference between the SP value of the most external layer of a photoconductive drum and the SP value of a crystalline polyester resins contained in toner matrix particles, measurement results of coverage with large silica particles to toner matrix particles, measurement results of adherence strength of large silica particles to toner matrix particles, evaluation results of contamination level within a machine, evaluation results of a slipping-through level under a low-humidity environment, and results of general evaluation, in each of the examples and comparative examples. Here, Examples 9-11 have the same conditions for types, additive amounts, coverage, adherence strength of large silica, and types of resins of the most external layer of a photoconductive drum, but are provided with difference among charge amounts of the toners under a low-humidity environment by changing a charge amount of a carrier in a developer.

TABLE 2

| | Type of large silica | | Resin of the most external layer of a drum | Charge amount of a toner under low humidity | Difference of SP values | Coverage (%) | Adherence strength (%) | Contamination level within a machine | Slipping-through level under low humidity | General |
|---|---|---|---|---|---|---|---|---|---|---|
| | Shape | Hydrophobizer | | | | | | | | |
| Example 1 | Associated | HMDS | PTFE | Low | 3.5 | 13 | 75 | + | +++ | +++ |
| Example 2 | Associated | HMDS | Polycarbonate | Low | 1.2 | 1.6 | 45 | + | ++ | ++ |
| Example 3 | Associated | PDMS | PTFE | Medium | 2.1 | 13 | 87 | + | +++ | +++ |
| Example 4 | Associated | PDMS | PTFE | High | 3.5 | 13 | 87 | + | + | + |

TABLE 2-continued

| | Type of large silica | | Resin of the | Charge amount of | Difference of | Cov- | Adherence | Contamination | Slipping-through | |
|---|---|---|---|---|---|---|---|---|---|---|
| | Shape | Hydrophobizer | most external layer of a drum | a toner under low humidity | SP values | erage (%) | strength (%) | level within a machine | level under low humidity | General |
| Example 5 | Associated | HMDS | Polycarbonate | Low | 2.2 | 13 | 85 | + | +++ | +++ |
| Example 6 | Associated | PDMS | Polycarbonate | Medium | 2.2 | 2.5 | 75 | + | +++ | +++ |
| Example 7 | Associated | PDMS | Polycarbonate | Medium | 1.2 | 6.5 | 72 | + | ++ | ++ |
| Example 8 | Associated | HMDS | PTFE | Low | 1.8 | 1.6 | 82 | + | +++ | +++ |
| Example 9 | Associated | HMDS | PTFE | Low | 2.9 | 13 | 24 | + | +++ | +++ |
| Example 10 | Associated | HMDS | PTFE | Medium | 2.9 | 13 | 24 | + | +++ | +++ |
| Example 11 | Associated | HMDS | PTFE | High | 2.9 | 13 | 24 | + | ++ | ++ |
| Comparative Example 1 | Associated | HMDS | PTFE | Low | 3.5 | 34 | 26 | − | +++ | − |
| Comparative Example 2 | Globular | HMDS | Polycarbonate | Low | 1.2 | 17 | 68 | + | − | − |
| Comparative Example 3 | Associated | HMDS | PTFE | Low | 2.9 | 0.7 | 64 | + | − | − |
| Comparative Example 4 | Associated | HMDS | PTFE | Low | 2.9 | 23 | 93 | + | − | − |
| Comparative Example 5 | Associated | HMDS | PTFE | Low | 2.9 | 23 | 12 | − | ++ | − |
| Comparative Example 6 | Globular | PDMS | PTFE | High | 3.5 | 34 | 33 | − | − | − |
| Comparative Example 7 | Globular | HMDS | PTFE | Low | 3.5 | 0.7 | 88 | + | − | − |
| Comparative Example 8 | Globular | PDMS | Polycarbonate | Low | 1.2 | 23 | 16 | − | − | − |
| Comparative Example 9 | Associated | PDMS | PTFE | Low | 1.2 | 23 | 93 | + | − | − |

As can be clearly seen from Table 2, the toners, the two-component developers, and the image-forming apparatuses in Examples 1-11, which have presence of associated silica on the surface of a toner matrix particle, a coverage with associated silica to toner matrix particles of 1% or more to 30% or less, and an adherence strength of associated silica to toner matrix particles of 20% or more to 90% or less, displayed superiority both in evaluation for a slipping-through level under a low-humidity environment and evaluation for a contamination level within a machine.

By contrast, Comparative Examples 1-9, which do not meet such requirements, showed "-(failed)" in any of evaluation of a slipping-through level under a low-humidity environment and evaluation of a contamination level within a machine, indicating inferiority to Examples.

Furthermore, employment of PTFE for the surface (the most external layer) of a photoconductive drum improved a slipping-through level. In addition, use of HMDS as a hydrophobizer for associated silica lowered a charge amount of a toner under a low-humidity environment and improved a slipping-through level.

OTHER EMBODIMENTS

Additionally, the embodiments disclosed herein are exemplifications in all points, and never provide a basis for limited interpretation. Accordingly, the technical scope of the present invention is not construed only by the embodiments described above, but defined on the basis of the recitation of the claims. The technical scope of the present invention also includes all alterations within the spirit and scope of the claims and equivalents thereof.

What is claimed is:

1. A toner having a toner matrix particle comprising a crystalline polyester resin, wherein associated silica is present on a surface of the toner matrix particle, and the associated silica is obtained by adding a tetraalkyl ammonium hydroxide compound as an association-promoting additive to a silica sol so as to bond two or more silica particles in the silica sol, a coverage with the associated silica onto the toner matrix particle is 1.6% or more to 13% or less, and an adherence strength of the associated silica to the toner matrix particle is 45% or more to 75% or less.

2. The toner according to claim 1, wherein the associated silica is hydrophobized with hexamethyldisilazane.

3. The toner according to claim 1, wherein an average particle diameter of the associated silica is 10 nm or more to 200 nm or less.

4. A two-component developer comprising the toner according to claim 1 and a carrier.

5. An image-forming apparatus using the two-component developer according to claim 4.

6. The image-forming apparatus according to claim 5, further comprising a photoconductive drum, wherein a difference between a Solubility Parameter (SP) value of a surface of the photoconductive drum and an SP value of the crystalline polyester resin is 1.5 or more.

7. The image-forming apparatus according to claim 6, wherein a resin forming the surface of the photoconductive drum is polytetrafluoroethylene.

8. The toner according to claim 1, wherein a number of the two or more silica particles that are obtained from the silica sol and are contained in each particle of the associated silica is less than or equal to 20.

* * * * *